United States Patent [19]

Weisend, Jr.

[11] Patent Number: 4,494,715
[45] Date of Patent: Jan. 22, 1985

[54] DEICER

[75] Inventor: Norbert A. Weisend, Jr., Cuyahoga Falls, Ohio

[73] Assignee: The B. F. Goodrich Company, New York, N.Y.

[21] Appl. No.: 493,125

[22] Filed: May 9, 1983

[51] Int. Cl.³ .............................................. B64D 15/18
[52] U.S. Cl. ............................ 244/134 A; 244/134 R
[58] Field of Search ............ 244/134 R, 134 A, 134 B, 244/134 E; 416/39, 97 A, 224

[56] References Cited

U.S. PATENT DOCUMENTS

| 2,173,262 | 9/1939 | Monegan et al. | 244/134 A |
| 2,436,889 | 3/1948 | Heston | 244/134 A |
| 2,957,662 | 10/1960 | Hess | 244/134 A |
| 3,173,491 | 3/1965 | Jusyk | 244/134 R |
| 3,370,814 | 2/1968 | Kageorge et al. | 244/134 A |
| 3,623,684 | 11/1971 | Kline | 244/134 A |

FOREIGN PATENT DOCUMENTS 542878 1/1942 United Kingdom .......... 244/134 A

Primary Examiner—Trygve M. Blix
Assistant Examiner—Rodney Corl
Attorney, Agent, or Firm—Joseph Januszkiewicz

[57] ABSTRACT

A deicer pad mounted on the leading edge of a helicopter blade. The deicer pad is a composite structure having two layers stitched together to form spanwise passageways on the intermediate portion that is essentially located on the intermediate portion of the blade and chordwise passageways on the spaced apart end portions that form the upper and lower portion of the deicer pad. The upper and lower portions are located rearwardly of the leading edge and are on the upper and lower portions of the helicopter blade.

8 Claims, 7 Drawing Figures

DEICER

This application is a co-pending application of Ser. No. 493,082 filed May 9, 1983.

BACKGROUND OF THE INVENTION

This invention relates to deicers and more particularly to pneumatic deicers for helicopter blades employing an elongated boot of a resilient material which is inflatable to remove ice formation on the rotating propeller blades.

Protective apparatus for preventing the accumulation of ice on a surface such as fixed aircraft wings and struts have employed electrical as well as pneumatic deicers. With respect to helicopter rotating blades, only electrical deicers have been used heretofore to maintain a low aerodynamic drag. The present invention provides a unique combination of a thin composite material forming a pneumatic deicer boot or deicer pad with spanwise and chordwise passageways providing improved dynamic properties for use on a helicopter rotating blade providing excellent ice removal characteristics.

Electrical deicers were used exclusively on helicopter blades because of the need to control the rotating mass accurately, maintain aerodynamic balance, precision contour thereof, and proper aerodynamic balance at high operating velocities. In helicopter rotary airfoils, the bending and centrifugal stresses are much different and more complicated than in either fixed wing airfoils or airplane propellers due to the design characteristics of the airfoil. Cyclic pitch control is also encountered in the rotary airfoil of a helicopter blade since the rotary airfoil moves first into the wind and then with the wind. Thus the helicopter blade design requires a complex airfoil design requiring the consideration of many factors and therefore only electrical deicers were used on helicopter blades to minimize design change factors. The present invention however is directed to the use of a unique combination of pneumatic design characteristics into a deicer pad which are able to provide a low aerodynamic drag and thereby overcomes prior objections to its use in a rotary airfoil. Such design also provides a deicer pad that has the unique ability to effectively remove ice formations at relatively low cost, low weight and at low operating power.

SUMMARY OF THE INVENTION

The present invention is directed to a composite layer pneumatic deicer pad which is mounted on the leading edge of a helicopter blade. The layers of the deicer pad are interconnected by stitching to define a pair of spanwise passageways at the leading edge of the pad and blade and by such stitching at the upper and lower sides of the pad to define chordwise passageways. The spanwise passageways are interconnected directly with certain of the chordwise passageways to allow for the free flow of pressurized air and only indirectly for example around the stitching with the remaining chordwise passageways for the flow of pressurized air. Such remaining chordwise passageways also are interconnected to such certain ones of the chordwise passageways for the flow of pressurized air around the stitching.

DETAILED DESCRIPTION

Figure 1:
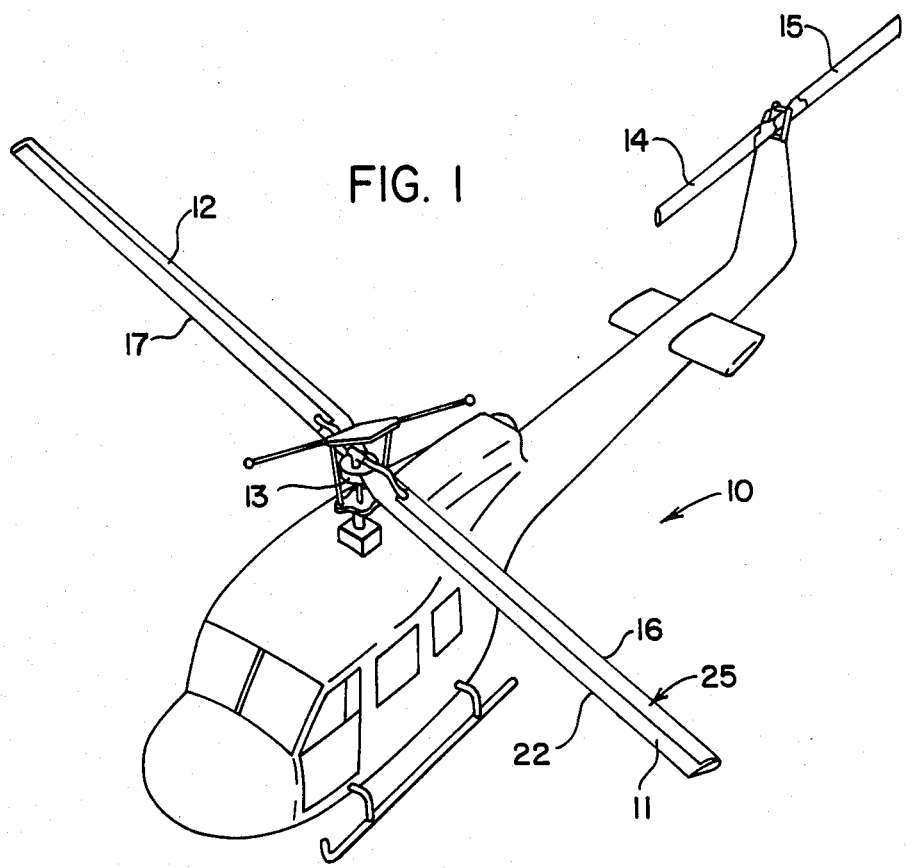
FIG. 1 is a perspective view of a helicopter with pneumatic deicers mounted upon the leading edges of the rotating blades.

Referring to the drawings wherein like reference numerals designate like or corresponding parts throughout the several views, there is shown in FIG. 1 a helicopter 10 having a pair of main rotor blades 11 and 12 extending outwardly from a hub 13 and a pair of auxiliary tail rotor blades 14 and 15. Such rotor blades are driven in a conventional manner well known in the art. The main rotor blades 11 and 12 have leading edges 16 and 17 respectively on opposite sides of the longitudinal center line that extends along the length of such blades and through the hub 13. The blades have a shank end or inboard end connected to the hub and an outboard end. It is understood that the invention is applicable to helicopter rotors having any desired number of blades, although the illustration of FIG. 1 discloses only a pair of blades. The invention will be described with respect to the blade 11 and it is understood that the blade 12 is similarly constructed.

The blade 11 with a leading edge 16 is constructed as an airfoil having a generally oval cross-sectional shape and tapering rearwardly along its upper surface portion and its lower surface portion to the trailing edge 22. The portion of the blade adjacent to the hub is referred to as the inboard end while that portion of the blade furthest away from the hub is referred to as the outboard end.

Figure 2:
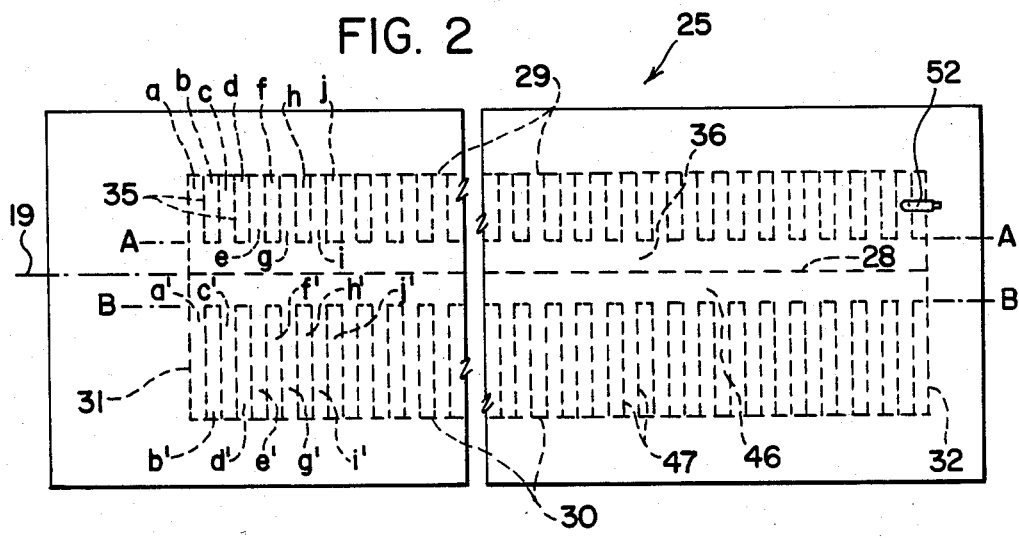
FIG. 2 is a plan view of a deicer boot with the position of the inflation passageways being shown in dotted lines.
Figure 3:
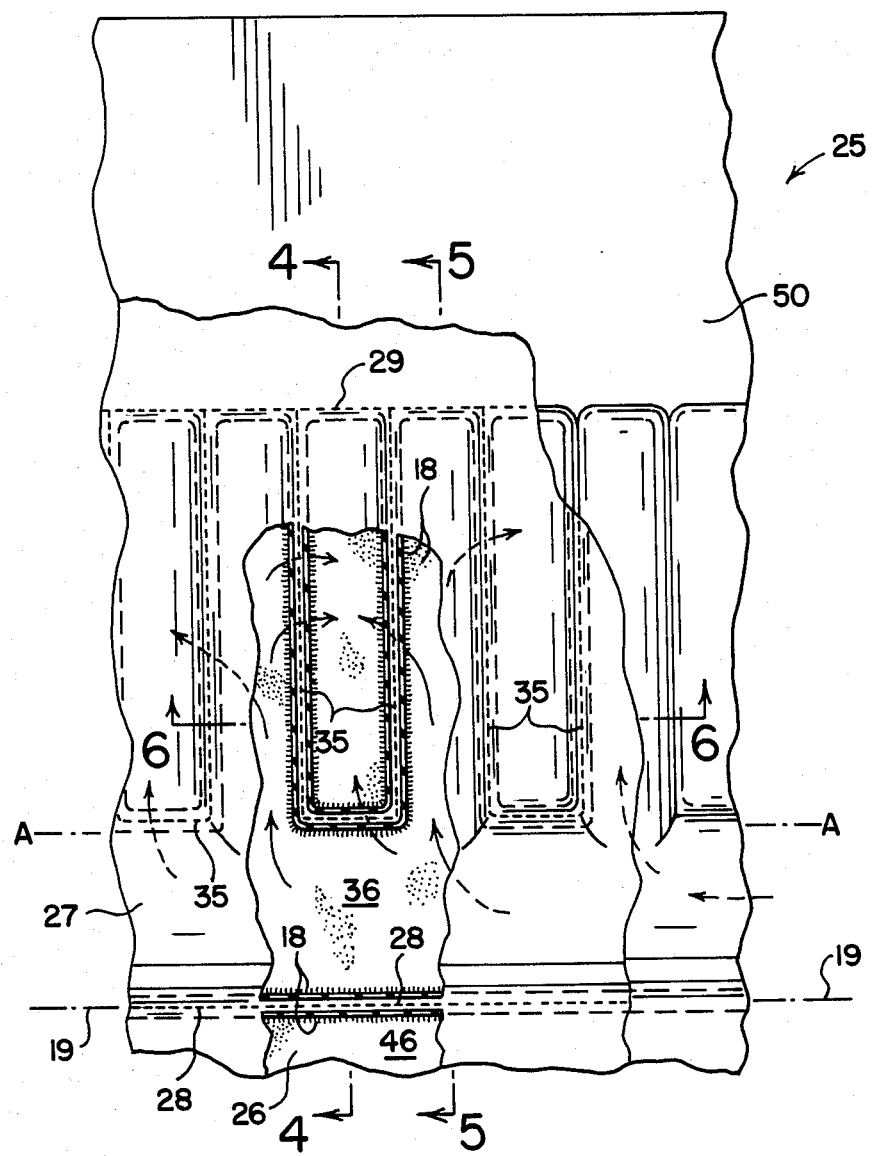
FIG. 3 is an enlarged plan view of a portion of a deicer boot with a portion of the coverings broken away to illustrate the stitching and the air flow pattern within the inflatable passageways.
Figure 4:
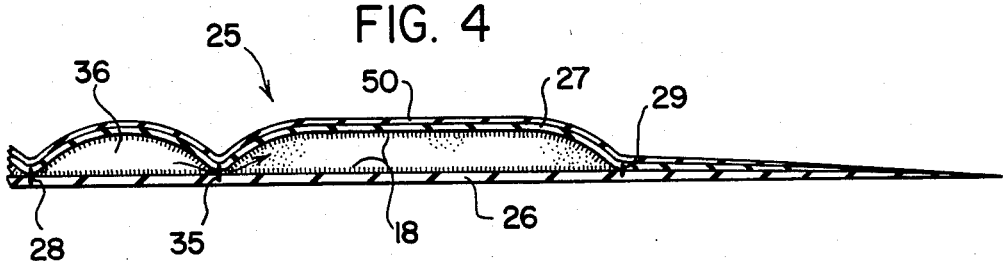
FIG. 4 is an enlarged section taken along line 4—4 of FIG. 3.
Figure 5:
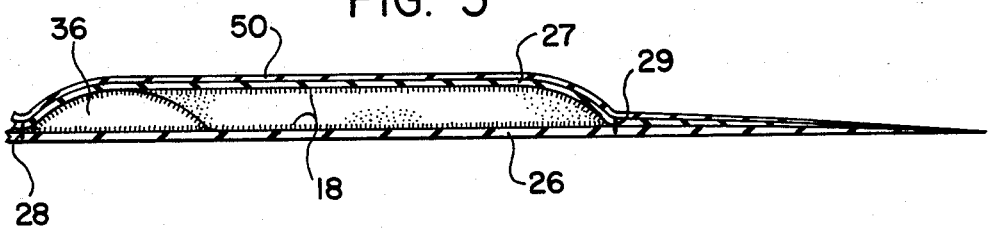
FIG. 5 is an enlarged section taken along line 5—5 of FIG. 3.
Figure 6:
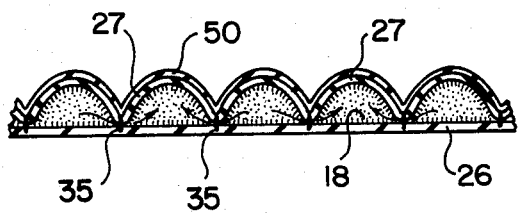
FIG. 6 is an enlarged section taken along line 6—6 of FIG. 3.

A deicer pad 25 mounted on the leading edge of the helicopter blade 11 extends rearwardly over a portion of the upper and lower surface portions of the blade 11. The deicer pad 25 is a laminated type of structure having an inner ply 26 (FIGS. 4–6) that is essentially a rectangular section of rubber or other resilient rubber-like material that tapers as the other layers of the composite structure at the respective side edges to facilitate the installation on the blade 11 without interfering with the aerodynamic effects of the airfoil. Such deicer pad does not need such tapering wherein the blade is recessed to provide a smooth transition between the deicer pad and the blade. Such deicer pad 25 and ply 26 has a longitudinal center line 19 (FIG. 2) that lies along the leading edge of the helicopter blade 11. Such ply 26 (FIGS. 4, 5, 6) may be a woven textile fabric which is coated with a rubber compound to make this ply 26 air impervious. As seen in FIGS. 4–6, the inside of the passageways have a heavy nap 18. Such interior napped surface is composed of very short closely grouped flexible fibers of overall uniform thickness. Such fibers mat together and collectively prevent complete closure and direct contact between opposing internal surfaces of the passageways to be described when the deicer pad is deflated, but have interstices through which residual air in the passageways may be vented or pumped from the passageways. By such uniform distribution of fibers, the external surface of the deicer pad is smooth and regular when the passageways are deflated and flattened. The terms spanwise and chordwise are used herein to designate the general direction of the passageways within the deicer pad. Spanwise is in a direction parallel to the leading edge of the helicopter airfoil while chordwise is along a line extending from the leading edge of the airfoil to the trailing edge of the airfoil (which is generally normal to the leading edge of the airfoil or normal to the spanwise direction). The final coating of the ply 26 is deferred until the ply stocks are stitched in a manner to be described. A ply 27 (FIGS. 4–6) of tricot fabric overlays ply 26 and is stitched to such ply 26 along the longitudinal center line 19 as indicated at 28 in FIGS. 2 and 3. The plies 26 and 27 are then stitched along the outer edge portion as at 29 and 30 and side edge portions as at 31 and 32.

That portion of the pad 25 that lies between the stitching along the longitudinal center line 19—19 and the outer edge stitched portion 29 is the upper deicer portion and that portion of the pad 25 that lies between the stitching along the longitudinal center line 19—19 and the outer edge stitched portion 30 is the lower deicer portion. Beginning along the outer edge 29 of the upper portion of the deicer pad namely plies 26 and 27, the plies are stitched together by running the stitching seam 35 back and forth in a zig zag pattern from outer edge 29 towards the longitudinal center line 19, which line lies along a line marked A—A in FIG. 2. This type of stitiching leaves a series of passageways that extend chord wise along the pad indicated as "a" though "j", however the full length of the pad has such chordwise passageways. With such stitching, alternate passageways such as "a", "c", "e", "g", "i", etc. open directly to a longitudinally extending passageway 36 which extends the full length of the deicer pad 25. Passageway 36 is defined by the stitching along the longitudinal center line, the end stitching 31 and 32, and that portion of the zig zag stitching that lies along line A—A. The alternate passageway "a" through "i" etc. as above described are referred to as the open ended chordwise passageways that communicate directly or unobstructedly with the spanwise passageway 36. The remaining alternate passageways "b", "d", "f", "h", "j", etc. referred to as the closed end passageways also communicate with passageway 36, but through or around the zig zag stitching 35 as illustrated in FIGS. 3-4. The closed end passageways "b", "d", "f", "h", "j", etc. also obtain pressurized air from adjacent open ended passageways through or around the zig zag stitching 35 (as illustrated in FIGS. 3 and 6).

In a similar manner the lower deicer portion has a longitudinally extending passageway 46 (similar to passageway 36) as defined by the stitching along the longitudinally extending center line 19, the end stitching 31, 32 and that portion of zig zag stitching that lies along a line B—B. Beginning along the outer edge 30 of the lower portion of the deicer pad, namely plies 26 and 27, the plies are stitched together by running the stitching seam 47 back and forth in a zig-zag pattern from the outer edge 30 towards the center line 19 to a line which lies along a line marked B—B in FIG. 2. This type of stitching leaves a series of passageways that extend in a chordwise direction along the deicer pad 25, which passageways are indicated as a', b', through j' etc. for the full length of the pad as indicated in FIG. 2. With such stitching, alternate passageways such as a', c', e', g', i', etc. open directly to a longitudinally extending passageway 46, which passageway 46 extends for the full length of the deicer pad 25. These alternate passageways a', c', e', g', i', etc. as described above are referred to as the 'open ended passageways' that communicate directly with the spanwise passageway 46. The remaining alternate passageways "b", "d", "f", "h", "j", etc. referred to as the 'closed end passageways' also communicate with passageway 46, but through or around the zig zag stitching 47 as illustrated in FIGS. 3 and 4. The closed end passageways "b", "d", "f", "h", "j", etc. also obtain pressurized air or communicate with adjacent open ended passageways through or around the zig zag stitching 47 (as illustrated in FIGS. 3 and 6).

The respective spanwise passageways or passageways 36 and 46 act as manifolds while simultaneously operating to break up the ice on the leading edge of the deicer pad 25. Being that the helicopter blades are of considerable length. The longitudinally extending passageways 36 and 46 are operative to communicate rapidly with the open ended passageways as well as the closed end passageways thereby effectively operating to break up the ice.

After the stitching of the plies 26 and 27, the lower or inner ply is coated with a suitable rubber compound to make such ply 26 impervious to air. A second ply 50 of suitable air impervious rubber compound is then suitably adhered to the adjacent ply 27 to essential make a single composite deicer pad 25. Such outer ply 50 may be an exterior rubber gum ply which is a resilient rubber compound such as a polyurethane or neoprene rubber which is resistant to the erosion of wind and rain. To inflate the respective tubes and passageways of the deicer a conduit 52 connects one of the open ended passageway to a suitable air pressure source (not shown) and to a vacuum source.

Figure 7:
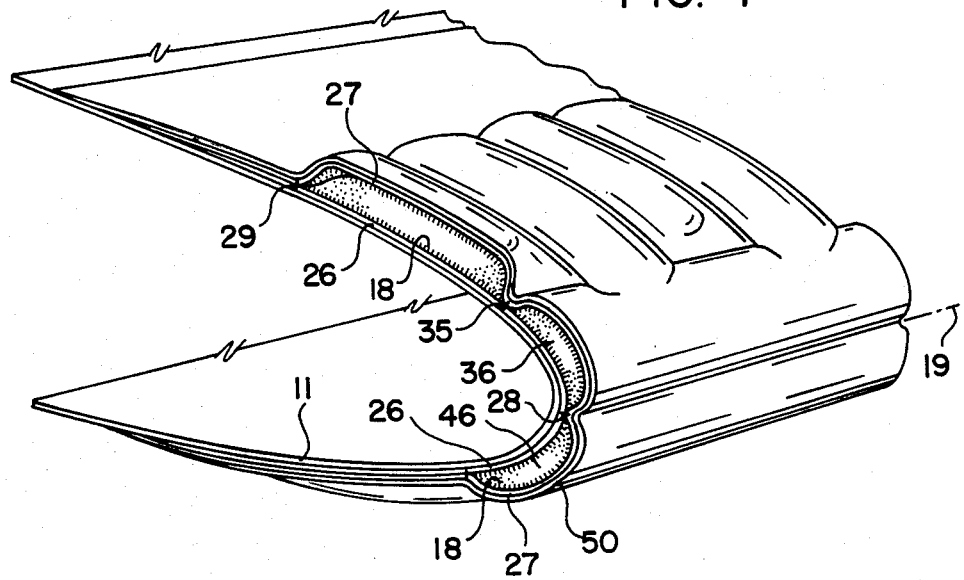
FIG. 7 is an enlarged perspective view partly in section of a portion of a helicopter blade showing the pneumatic inflation passageways in distended condition.

In an installation of the above described deicer pad 25 on the blade 11 of a helicopter, the deicer shoe, or pad 25 is adhered flat against the surface of the leading edge and adjacent portions of the blade by a suitable adhesive of which many different kinds are well known in the art such that the longitudinal center line 19 of the deicer pad 25 coincides with the centerline of the leading edge 16 of the helicopter blade 11. The inner or bottom ply 26 has its upper portion adhered to the upper tapering surface of the blade 11 while the lower portion of the ply 26 is adhered to the lower tapering surface of the blade. The sewing or stitching permits the crossflow of air from the open ended passageway to the closed end passageway and vice versa as well as from the spanwise longitudinally extending passageways 36 and 46 to closed end passageways. As seen in FIG. 7, the pressurization of the passageways 36 and 46 distends the spanwise passageways while simultaneously communicating directly with the open ended passageways a, c, e, g, i, etc. and a', c', e', g', i', etc. The remaining closed end passageways are inflated by the crossflow of air from the open ended passageways and the main spanwise passageways. Such pressurization stretches the deicing passageways which provides the cracking and shearing stresses to the ice thereon causing such ice to be broken into pieces and breaking its bond with the de-icing surface. This coupled with the scavenging effect of the air stream and the centrifugal forces will remove the ice particles from the blade 11. This combination of utilizing the spanwise passageways along the leading edge of the blade airfoil while using the chordwise passageways along the upper and lower portions of the pad provide a low aerodynamic drag while maintaining excellent ice removal characteristics. When the deicing system is off, a vacuum is applied to the deicing passageways to resist negative aerodynamic pressures and to maintain the passageways in a flat or deflated condition. The deicer pad 26 has tapered trailing edges as well as ends to promote a smooth airflow, however, the blade may be recessed to accommodate a flat pad to provide for a smooth transition between the deicer pad and the airfoil. The electrical current requirements for the system in the on position is 0.50 amps or less with 0.05 miliamps or less for a timer to operate a flow control valve for intermittent oerations of less than 2 second intervals.

Various modifications are contemplated and may obviously be resorted to by those skilled in the art without departing from the described invention, as hereafter defined by the appended claims, as only a preferred embodiment thereof has been disclosed.

I claim:

1. A pneumatic deicer pad for a rotating helicopter blade having a leading edge, an inboard end and an outboard end; said deicer pad overlying said helicopter blade so that the center line of said pad coincides with said leading edge of said blade; said pad having an intermediate portion overlying said leading edge and also having a pair of spaced apart portions located rearward of said centerline when positioned on said blade to provide a pair of rearwardly disposed edges; said spaced apart portions defining an upper portion and a lower portion as mounted on said blade; said deicer pad having an inner ply for attachment to said blade; an outer extensible elastic ply overlying said inner ply; said plies being stitched on said intermediate portion to define at least a pair of spanwise passageways; said plies being stitched together at said upper and lower rearwardly disposed spaced apart portions to define a plurality of adjacent chordwise extending passageways in said respective upper and lower portions that all terminate adjacent said spanwise passageways; certain ones of said chordwise passageways communicate directly with said spanwise passageways; the remaining ones of said chordwise passageways communicate around said stitching with the adjacent ends of said spanwise passageways; said certain ones of said chordwise passageways also communicate with adjacent ones of said remaining ones of said chordwise passageways around said stitching; means for communicating said chordwise and spanwise passageways with a pressure source to elastically distend and inflate said chordwise and spanwise passageways to break up ice formations on said pad; all of said plies being covered with an air impervious layer to retain pressurized air within said deicer pad; and said stitching on said inner ply and outer extensible ply on said rearwardly disposed spaced apart portions are of a serpentine design to provide said chordwise passageways in side by side relationship.

2. A pneumatic deicer pad for a rotating helicopter blade as set forth in claim 1 wherein said deicer pad extends from said inboard end of said helicopter blade to said outboard end of said helicopter blade.

3. A pneumatic deicer pad for a rotating helicopter blade as set forth in claim 2 wherein said means for communicating said passsageways with a pressure source includes a means for pulling a vacuum on said passageways.

4. A pneumatic deicer pad for a rotating helicopter blade as set forth in claim 3 wherein said spanwise passageways are of greater cross-sectional dimension than said chordwise passageways.

5. A pneumatic deicer pad for a rotating helicopter blade as set forth in claim 4 wherein said chordwise passageways in said lower portion of said pads are greater in length than said chordwise passageways in said upper portion of said pad.

6. A pneumatic deicer for a rotating helicopter blade having a leading edge, an inboard end, and an outboard end; said blade having a longitudinal center line along said leading edge; a deicer pad with an upper portion and a lower portion disposed along said leading edge of said blade substantially for the full length thereof with one end of said deicer pad having an inboard end at said inboard end of said blade and the other end of said pad lying closely adjacent said outboard end of said blade; said deicer pad having a pair of laterally spaced side edges interconnecting said inboard end with said outboard end of said deicer pad; said pad being a composite layer of resilient air impervious material; said pad being stitched along said spaced side edges; said pad being stitched to define a pair of longitudinally extending spanwise passageways located along said leading edge of said blade; said passageways sharing a common seam disposed along said longitudinal center line of said pad; each of said passageways having a side edge that is spaced to either side of said center line; each of said upper portion of said pad and each of said lower portion of said pad having a continuous seam from stitching that extends in a zig zag pattern from said inboard end of said pad to said outboard end of said pad to define a series of closely spaced passageways that extend chordwise on said blade from said side edges of said longitudinally extending spanwise passageway to a position closely adjacent said side edges of said pad; certain ones of said chordwise passageway communicating directly with adjacent ones of said spanwise passageways; the remaining one of said chordwise passageways communicating with adjacent ones of said first mentioned chordwise passageway that communicate directly with said spanwise passageway and also communicate with adjacent ones of said spanwise passageways around said stitching seams separating their connection to said adjacent chordwise and spanwise passageways; means connected to one of said passageways that communicates directly with said spanwise passageway to pressurize and exhaust air from said deicer pad to provide a deicing action for said blade; and said composite layers of air impervious material being covered with a resilient air impervious material.

7. A pneumatic deicer as set forth in claim 6 wherein said spanwise passageways are of larger cross-sectional dimension than said chordwise passageways.

8. A pneumatic deicer as set forth in claim 7 wherein said chordwise passageways in said lower portion of said pad are greater in length than said chordwise passageways in said upper portion of said pad.

* * * * *